(No Model.) 2 Sheets—Sheet 2.
C. M. BROWN.
HANDLE BAR FOR BICYCLES.
No. 302,979. Patented Aug. 5, 1884.
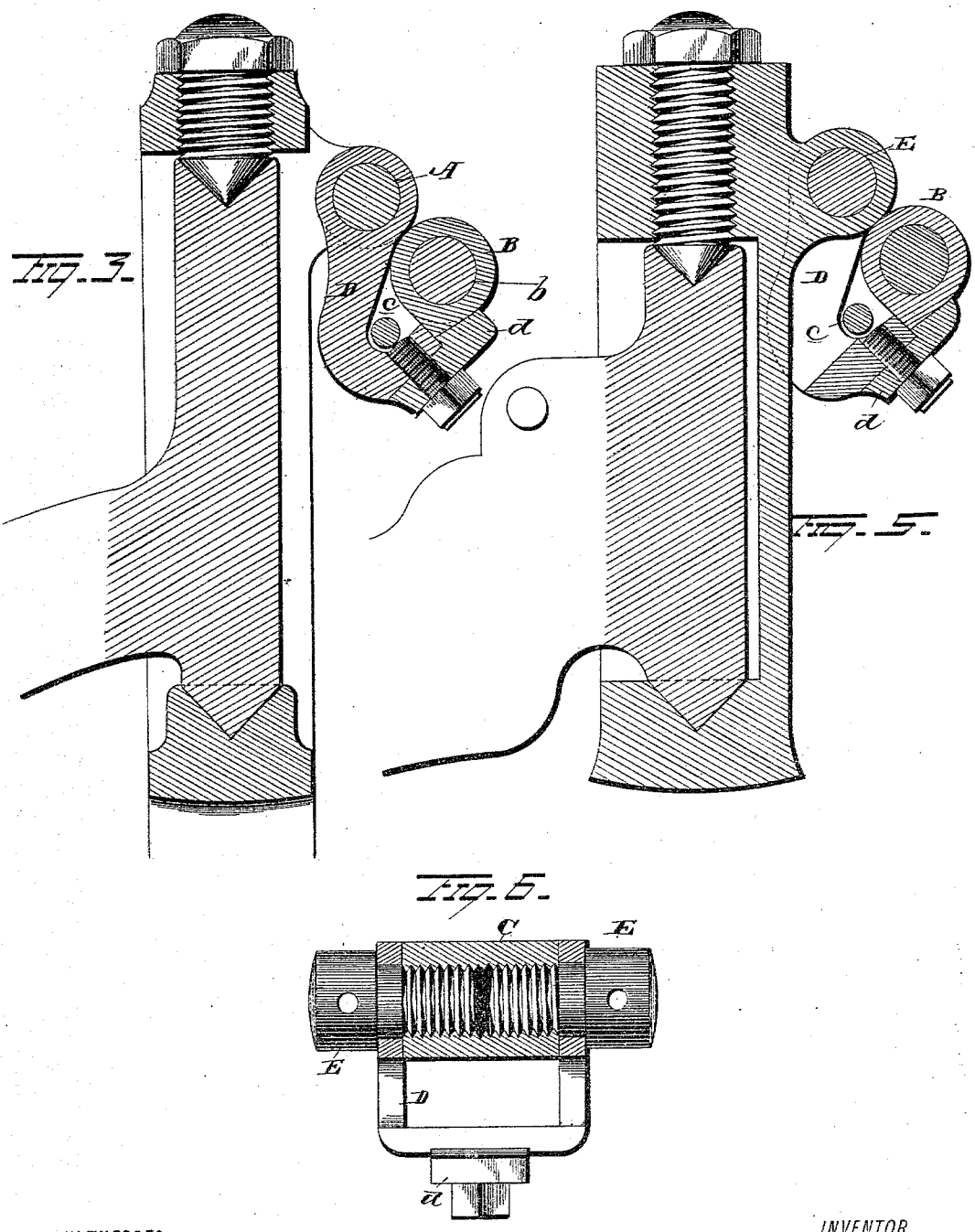

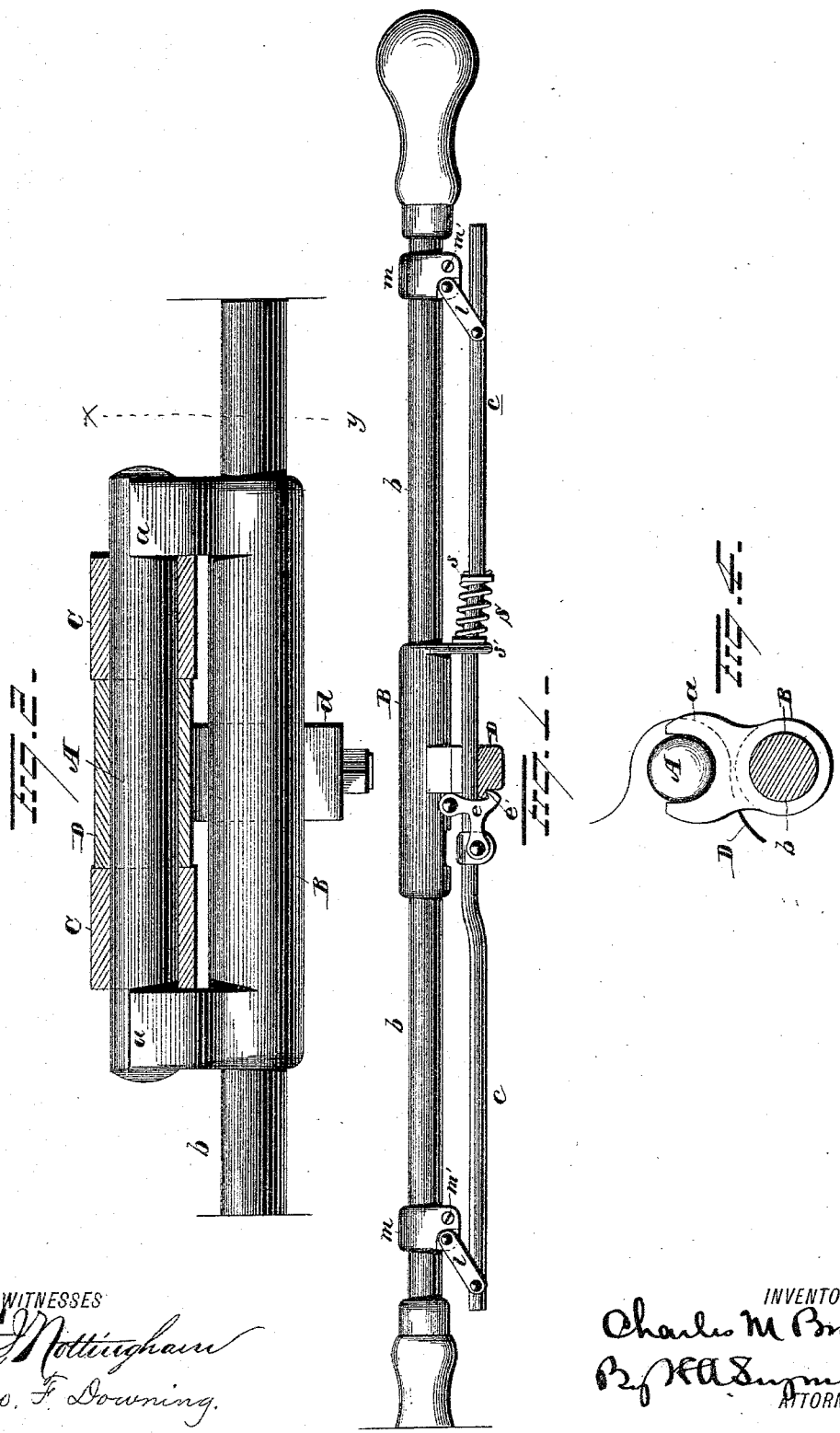

UNITED STATES PATENT OFFICE.

CHARLES M. BROWN, OF ROCKFORD, ILLINOIS.

HANDLE-BAR FOR BICYCLES.

SPECIFICATION forming part of Letters Patent No. 302,979, dated August 5, 1884.

Application filed April 25, 1884. (No model.)

*To all whom it may concern:*

Be it known that I, CHARLES M. BROWN, of Rockford, in the county of Winnebago and State of Illinois, have invented certain new and useful Improvements in Handle-Bars for Bicycles and Velocipedes; and I do hereby declare the following to be a full, clear, and exact description of the invention, such as will enable others skilled in the art to which it appertains to make and use the same.

My invention relates to an improvement in bicycles or velocipedes, the object of the same being to provide a handle-bar which shall be automatically detached from the steering-head when the rider is thrown forward and about to take a "header," thereby allowing the rider to land upon his feet, a further object being to provide a detachable handle-bar which may be readily attached to the bicycles and velocipedes now in use or already manufactured, a further object being to provide an automatically-detachable handle-bar which shall be secure in its position, except in case of accident or intentional displacement, and which shall be neat, durable, and comparatively inexpensive.

With these ends in view my invention consists in certain features of construction and combinations of parts, as will be described hereinafter, and pointed out in the claims.

In the accompanying drawings, Figure 1 is a view of my improved handle in front elevation, partly in section. Fig. 2 is a top plan view of the central portion, partly in section. Fig. 3 is a vertical transverse sectional view through the center. Fig. 4 is a vertical transverse section through the line $x\,y$ of Fig. 2, and Figs. 5 and 6 represent a modification.

C C represent the sockets commonly found on the front of the steering-head of a bicycle for holding a handle-bar, $b$. In place of the handle-bar, I secure a short bar or pin, A, in the sockets C, allowing the ends of said pin to project a short distance beyond sockets on either side. The handle-bar $b$ is provided with a sleeve, B, at its center, the said sleeve having bifurcated lugs $a$ on each end. The end of each lug $a$ is provided with a semicylindrical recess adapted to partially embrace the pin A at each end. The handle-bar is further provided with collars or clips $m$, one near each handle, conveniently secured to the bar by clamping-screws $m'$. To each of the clips $m$ a pair of arms, $l$, is pivoted, the opposite ends of said arms being pivoted to a trip-rod, $c$, the purpose of which will hereinafter appear. The handle-bar is secured to the steering-head by a curved arm, D, one end of which is provided with a horizontal sleeve, which embraces the pin A between the sockets C, and the other end curves under the handle-bar, passing outside of the trip-rod $c$, and rests in contact with the sleeve B for a short distance, a transverse section of the surface of contact D and B being the arc of a circle whose center is at the axis of the pin A. This admits of the bar $b$ being swung forward and upward for a short distance without becoming loose from the steering-head. D is preferably made in two parts, D $d$, as shown in Fig. 3, united by a set-screw, so that any lost motion between D and B may be readily eliminated.

With a little care the handle-bar may safely be used in riding without any other attachment than the curved arm just described in connection with the lugs $a$ in contact with the pin A, the position of the bar, as shown in Fig. 3, being such that the usual strain upon it, which is backward and upward, tends to hold it to its place; but, in order to secure the bar in a more reliable manner to the steering-head under all desirable circumstances, I apply a catch, $e$, in the following manner: The catch $e$ is an angle-bar, both ends of which are bifurcated, the vertex of the angle being notched and adapted to engage a shoulder, $e'$, on the side of the curved arm D. One end of the catch $e$ is pivoted to the sleeve B in a line with the two pair of arms $l$, before mentioned, and the other end to the trip-rod $c$, the trip-rod passing between the branches of the end pivoted to the sleeve. The distance between the pivots on the two pairs of arms and catch are the same, and the arms occupy an oblique position with reference to the bar $b$, when the catch $e$ is in contact with the curved arm D. The trip-rod is held a short distance away from the bar $b$, and the catch in contact with the notch or shoulder, $e'$, by the tension of a spring, S—preferably a spiral spring—about the rod c, compressed between a stop, s, on the rod, and an eye or loop, s', on the sleeve B.

From the above construction it will be noticed that a transverse pressure on the rod c will cause the rod to move toward the bar b, and at the same time give the bar a slight longitudinal movement, thereby releasing the catch e from the shoulder e', and allowing the bar b to be carried upward and forward free from the steering-head. It will be noticed further that the position of the several parts is such, as shown in Fig. 3, that the forward motion of the rider, when taking a header, will automatically release the bar b and allow the same to move forward with him without obstructing his legs, thus suffering him to land upon his feet instead of head.

The above device may be, with slight modification, adapted to any bicycle having a socket to receive the handle-bar. Figs. 5 and 6 show how it may be applied to a steering-head to which a handle-bar, in two parts, is screwed into a socket from either side. In this instance the part D is bifurcated, embracing the socket C, to which it is firmly attached by screws E in place of the original bar. The round heads of these screws serve as supports for the lugs on the ends of the sleeve B, in a similar manner to the projecting ends of the pin A, before described.

It is evident that slight changes may be made in the form and arrangement of the several parts described without departing from the spirit and scope of my invention. Hence I do not wish to limit myself strictly to the construction herein set forth; but Having fully described my invention, what I claim as new, and desire to secure by Letters Patent, is—

1. In a velocipede, the combination, with a steering-head provided with a bearing, of a handle-bar resting on said bearing, and adapted to be removed therefrom in a curved path.

2. In a velocipede, the combination, with a steering-head having a pintle secured thereto, of a handle-bar resting on said pintle, and adapted to be removed therefrom in a curved path.

3. In a velocipede, the combination, with a steering-head provided with a bearing, of a handle-bar resting on said bearing, and adapted to be removed therefrom in a curved path, a catch for holding the bar in position, and the devices, substantially as described, for releasing the catch.

4. In a velocipede, the combination, with a steering-head and a hinge-pin secured thereto, of a curved arm secured to the hinge-pin, and a handle-bar secured, in a limited rocking motion, to the steering-head by contact with the hinge-pin and curved arm, substantially as set forth.

5. In a velocipede, the combination, with a hinge-pin or pivotal bar secured to the steering-head, and a handle-bar adapted to rock on the pivotal bar, of a curved arm secured to the pivotal bar and partially embracing the handle-bar, the curve of contact between the arm and handle-bar having its center in the axis of the pivotal bar, substantially as set forth.

6. In a velocipede, the combination, with a pivotal bar secured to the steering-head, and a handle-bar loosely engaging the pivotal bar, of a curved arm secured to the pivotal bar and partially embracing the handle-bar, the curved arm being formed in two sections for taking up lost motion, substantially as set forth.

7. In a velocipede, the combination, with a handle bar adapted to be removed from the steering-head in a curved path, of a catch adapted to hold the bar securely in position and release the bar from its position, substantially as set forth.

8. In a velocipede, the combination, with a handle-bar adapted to be removed from the steering-head in a curved path, of a catch for holding the bar securely in position, and devices, substantially as described, for disengaging the catch and releasing the bar by the forward motion of the body, substantially as set forth.

9. In a velocipede, the combination, with a steering-head having a pintle secured thereto, of a handle-bar having lugs adapted to rest loosely on said bearings, and a curved arm depending from said pintle, and engaging a projection on the sleeve of the handle-bar for the purpose of holding the latter in position by frictional engagement therewith, substantially as set forth.

10. In a velocipede, the combination, with a handle-bar held securely to a steering-head by a catch, of a rod pivoted to the bar and catch, said rod having a longitudinal motion imparted to it by a lateral pressure, substantially as set forth.

In testimony whereof I have signed this specification in the presence of two subscribing witnesses.

CHARLES M. BROWN.

Witnesses:
 DAVID N. STARR,
 W. L. RUTLEDGE.